United States Patent
Seki

(10) Patent No.: US 9,021,003 B2
(45) Date of Patent: Apr. 28, 2015

(54) PROCESSOR AND OPERATING METHOD

(75) Inventor: Katsutoshi Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 275 days.

(21) Appl. No.: 13/805,519

(22) PCT Filed: Jun. 16, 2011

(86) PCT No.: PCT/JP2011/064324
§ 371 (c)(1),
(2), (4) Date: Dec. 19, 2012

(87) PCT Pub. No.: WO2011/162310
PCT Pub. Date: Dec. 29, 2011

(65) Prior Publication Data
US 2013/0097214 A1    Apr. 18, 2013

(30) Foreign Application Priority Data
Jun. 23, 2010   (JP) .................................. 2010-142206

(51) Int. Cl.
G06F 17/14   (2006.01)
G06F 7/548   (2006.01)
G06F 7/544   (2006.01)

(52) U.S. Cl.
CPC .............. *G06F 7/548* (2013.01); *G06F 7/5446* (2013.01); *G06F 17/141* (2013.01)

(58) Field of Classification Search
None
See application file for complete search history.

(56) References Cited

U.S. PATENT DOCUMENTS

| 3,766,370 | A | * | 10/1973 | Walther | 708/494 |
| 7,082,451 | B2 | * | 7/2006 | Kulkarni et al. | 708/404 |
| 2004/0064493 | A1 | * | 4/2004 | Kulkarni et al. | 708/404 |
| 2006/0282489 | A1 | * | 12/2006 | Khan et al. | 708/422 |
| 2007/0073796 | A1 | * | 3/2007 | Meilhac et al. | 708/404 |
| 2007/0266070 | A1 | * | 11/2007 | Sung et al. | 708/404 |
| 2010/0082722 | A1 | * | 4/2010 | Sinnokrot et al. | 708/404 |
| 2011/0010408 | A1 | | 1/2011 | Seki | |
| 2013/0097214 | A1 | * | 4/2013 | Seki | 708/440 |

FOREIGN PATENT DOCUMENTS

JP    9-223124 A    8/1997
WO   2009/110560 A1    9/2009

OTHER PUBLICATIONS

Office Action, dated Oct. 29, 2013, issued by the Japanese Patent Office in counterpart Japanese Patent Application No. 2012-521513.
(Continued)

*Primary Examiner* — David H Malzahn
(74) *Attorney, Agent, or Firm* — Sughrue Mion, PLLC

(57) ABSTRACT

Disclosed is a processor that is able to efficiently execute DFT operations without having part of a basic operational circuit idle even during non-DFT-operation processing. The processor (1) has an operational means (operation unit) (2) and a control means (control unit) (3). The operation means (2) has a plurality of shift addition-and-subtraction means connected such that CORDIC (COordinate Rotation DIgital Computer) operations can be executed. The shift adding-and-subtracting means also execute shift addition-and-subtraction processing of butterfly operations that process shift addition-and-subtraction for one stage or more. The control means (3) instructs the operation means (2) to execute either CORDIC operations or butterfly operations, based on a plurality of data received from the outside.

4 Claims, 11 Drawing Sheets

(56) References Cited

OTHER PUBLICATIONS

Takala, Jarmo, et al., "Butterfly Unit Supporting Radix-4 and Radix-2 EFT," Proceedings of International Workshop on Spectral Methods and Multirate Signal Processing, Jun. 20, 2005, pp. 47-54, http://ticsp.cs.tut.fi/images/4/48/Cr1028-riga.pdf.

Benjamin Heyne, et al., Implementation of a Cordic Based FFT on a Reconfigurable Hardware Accelerator, 3rd Karlsruhe Workshop on Software Radios, 2004.

Mihai Sima, et al., "Embedded Reconfigurable Solution for OFDM Detection over Fast Fading Radio Channels", Proc. the IEEE Workshop on Signal Processing Systems, Oct. 2007, pp. 13-18, Shanghai, China.

Shmuel Winograd, "On Computing the Discrete Fourier Transform", Proc. National Academy of Sciences, Apr. 1976, pp. 1005-1006, vol. 73, No. 4.

Roberto Sarmiento, et al., "A CORDIC Processor for FFT Computation and Its Implementation Using Gallium Arsenide Technology", IEEE Transactions on Very Large Scale Integration (VLSI) Systems, Mar. 1998, pp. 18-30, vol. 6, Issue: 1.

Alvin M. Despain, "Fourier Transform Computers Using CORDIC Iterations", IEEE Transactions on Computers, Oct. 1974, pp. 993-1001, vol. C-23, No. 10.

* cited by examiner

PROCESSOR AND OPERATING METHOD

CROSS REFERENCE TO RELATED APPLICATIONS

This application is a National Stage of International Application No. PCT/JP2011/064324 filed Jun. 16, 2011, claiming priority based on Japanese Patent Application No. 2010-142206 filed Jun. 23, 2010, the contents of all of which are incorporated herein by reference in their entirety.

TECHNICAL FIELD

The present invention relates to a processor including an operational circuit capable of executing CORDIC (COordinate Rotation DIgital Computer) operation, and an operating method using thereof.

BACKGROUND ART

As a hardware-directed algorithm for an elementary function operation, such as a trigonometric function, a CORDIC (COordinate Rotation Digital Computer) algorithm is known. The CORDIC is an iterative computing algorithm and expresses functions as vector rotation on a two-dimensional plane, and finds a true value by iterative vector rotation of a predetermined basic rotational angle. In the CORDIC algorithm, by selecting a rotational coordinate system (linear, circular, or hyperbolic), and by repeating a simple operation of a shift, addition, subtraction and table look-up, multiplication and division, trigonometric function computations, exponential and logarithmic computations, and hyperbolic function computations and the like can be executed. The CORDIC algorithm is widely used in digital signal processing fields.

The shift addition-and-subtraction means a operation composed of shift operations and an addition-and-subtraction.

Hereinafter, the CORDIC algorithm will be described in detail.

a j-th rotation process is represented by Equation (1).

$$x(j+1) = x(j) + m\sigma_j 2^{-j} y(j)$$
$$y(j+1) = y(j) - \sigma_j 2^{-j} x(j)$$
$$z(j+1) = z(j) + \sigma_j \alpha_j$$

$$\alpha_j = \frac{1}{\sqrt{m}} \arctan(\sqrt{m} * 2^{-j})$$

$$j = 0, 1, \ldots, n-1$$

$$m = \begin{cases} 1 & \text{(Circular coordinate system)} \\ 0 & \text{(Liniar coodinate system)} \\ -1 & \text{(Hyperbolic oodinate system)} \end{cases}$$
(1)

Here, n is an iteration count, and $\alpha_j$ is an angle of a micro-rotation. And $\sigma_j \in \{1,-1\}$ is a parameter on a rotation direction (hereinafter, denoted as rotation direction parameter).

Taking circular polar coordinates as an example, A vector $[x(n), y(n)]'$ implementing a rotation of a rotational angle $\theta$ with respect to a vector $[x(0), y(0)]'$ is represented by Equation (2) and Equation (3) based on Equation (1).

$$\begin{bmatrix} x(n) \\ y(n) \end{bmatrix} = \frac{1}{K_n} \begin{bmatrix} \cos\theta & \sin\theta \\ -\sin\theta & \cos\theta \end{bmatrix} \begin{bmatrix} x(0) \\ y(0) \end{bmatrix}$$
(2)

$$K_n = 1 \Big/ \prod_{j=0}^{n-1} \sqrt{1 + 2^{-2j}}$$
(3)

Here, $K_n$ is a scaling factor. The rotation based on the CORDIC algorithm is a pseudo rotation that accompanies scaling. In order to correct the scaling, it is necessary to perform processing indicated in Equation (4).

$$\begin{bmatrix} xf \\ yf \end{bmatrix} = K_n \begin{bmatrix} x(n) \\ y(n) \end{bmatrix}$$
(4)

As indicated in Equation (5), the CORDIC algorithm realizes a rotation operation of the rotational angle $\theta$ as a combination of basic rotation of angle $\alpha_j$.

$$\theta = \sum_{j=0}^{n-1} \sigma_j \alpha_j$$
(5)

The CORDIC algorithm has 2 modes: a Rotation mode and a Vector mode, according to a method of determining the rotation direction parameter σj given in Equation (6).

$$\sigma_j = \begin{cases} \text{sign}(z(j)) & \text{(Rotation)} \\ \text{sign}(y(j)) & \text{(Vectoring)} \end{cases}$$
(6)

In the Rotation mode, with a desired angle $\theta$ as z(0), processing is performed to rotate, by an amount $\theta$, an initial vector $[x(0), y(0)]'$. In the Vector mode, with an initial angle z(0) as 0, a process is performed to rotate the vector up to an x axis, and to obtain a rotational angle (z(n)) thereof and the norm (x(n)) of the initial vector.

Since the CORDIC algorithm implements the rotation process by n basic rotations, essentially a rotational angle error less than a final basic rotational angle $\alpha_{n-1}$ occurs. Equation (7) holds true with n bit accuracy. The CORDIC algorithm has to perform iterative processing of the same number of stages as the required bit accuracy.

$$\alpha \approx 2^{-j} (j > n/3)$$
(7)

As mentioned above, the CORDIC algorithm is a unified algorithm operating multiplication and division, trigonometric function, exponential and logarithmic functions, hyperbolic function and the like. As a processor for digital signal processing taking advantages of the feature, a first related art which adopts a CORDIC circuit as a basic processing element is known (refer to the non-patent literature 1 and the non-patent literature 2).

FIG. 7 shows a diagram showing a configuration of processor shown in the first related art, processor 1000 includes control circuit 1001, M CORDIC-Processing Elements (hereinafter, referred to as CORDIC-PE) $1002_1$ to $1002_M$ and memory 1003. The M is a positive integer.

a memory 1003 reads out data (input data) for the input of CORDIC-PEs $1002_1$ to $1002_M$ according to an address that control circuit 1001 provides, and writes from CORDIC-PEs $1002_1$ to $1002_{M's}$ output data (operation result)

CORDIC-PEs $1002_1$ to $1002_M$ change the operational mode based on an operational mode control signal from control circuit 1001. CORDIC-PEs $1002_1$ to $1002_M$ operate the input data from the memory 1003 and returns the result to memory 1003. The operational mode defines a kind of operations, including multiplication and division, trigonometric function, exponential and logarithmic functions, hyperbolic function or the like in the CORDIC algorithm.

DFT (Discrete Fourier Transform) is one of the commonly used operation in the field of digital signal processing. N-point DFT processing N-point discrete periodic data is expressed in Equation (8).

$$X(k) = \sum_{n=0}^{N-1} x(n) W_N^{kn}, \quad (8)$$

$$k = 0, 1, \ldots, N-1$$

where $$W = e^{-j\frac{2\pi}{N}}$$

Here, N is assumed to be N1*N2 ("*" means multiplication in following equations), and then Equation (8) is rewritten by Equation (9).

$$X(k_1 + N_1 k_2) = \sum_{n_2=0}^{N_2-1} \left( \sum_{n_1=0}^{N_1-1} x(N_2 n_1 + n_2) W_{N_1}^{k_1 n_1} \right) W_N^{k_1 n_2} W_{N_2}^{k_2 n_2} \quad (9)$$

$$n = N_2 n_1 + n_2, \, k = k_1 + N_1 k_2$$

where $$0 \le n_1 \le N_1, \, 0 \le n_2 \le N_2, \, 0 \le k_1 \le N_1, \, 0 \le k_2 \le N_2$$

According to Equation (9), N-point DFT carries out N2-point DFT N1 times after multiplying the twiddle factor $W_N^{k_1 n_2}$ with a result of carrying out N1-point DFT N2 times.

In a similar way, when $$N = \prod_{i=0}^{S-1} R_i,$$

N-point DFT is processed through S stages. At each stage, (N/Ri) Ri-point DFTs ("/" means division in following equations), and multiplication of the twiddle factor (twiddle factor multiplication) are carried out. The stage is defined as one step when the operation process is divided into a plurality of steps. R-point DFT at each stage is called a R-radix butterfly operation. The small-N algorithm is an example for realizing the butterfly operation (for example, refer to the non-patent literature 3).

Hereinafter, the radix-2, radix-4, and radix-5 butterfly operations with the small-N algorithm will be described with reference to FIGS. 8 to 10.

As shown in Equation (8) and Equation (9), power-of-2 Point-DFT can be decomposed into the radix-2 butterfly operations shown in FIG. 8, and the twiddle factor multiplications. The twiddle factor multiplication is carried out in the circular coordinate system Rotation mode of CORDIC. As shown in Equation (10), the radix-2 butterfly operation are divided into the π/4 rotation process and the scaling process of multiplying ±√2.

$$\begin{bmatrix} X(0) \\ X(1) \end{bmatrix} = \begin{bmatrix} 1 & 1 \\ 1 & -1 \end{bmatrix} \begin{bmatrix} x(0) \\ x(1) \end{bmatrix} = \begin{bmatrix} \sqrt{2} & 0 \\ 0 & -\sqrt{2} \end{bmatrix} \begin{bmatrix} \frac{1}{\sqrt{2}} & \frac{1}{\sqrt{2}} \\ -\frac{1}{\sqrt{2}} & \frac{1}{\sqrt{2}} \end{bmatrix} \begin{bmatrix} x(0) \\ x(1) \end{bmatrix} \quad (10)$$

When ignoring the scaling process of multiplying √2, the π/4 rotation can be processed with Rotation mode of CORDIC in the circular coordinate system. Effect of sign inversion cancels out additional π phase rotation in the twiddle factor multiplication The effect with √2 scaling can be canceled by scaling correction after all stage. The scaling correcting process can be carried out in the multiplication mode (linear coordinate system Rotation mode) of the CORDIC. Accordingly, power-of-2 DFT can be processed with the CORDIC. Details thereof is disclosed in the non-patent literature 1.

As shown in FIG. 9 and FIG. 10, the 3-radix and radix-5 butterfly operations can be carried out by addition-and-subtraction and a coefficient multiplication similarly to radix-2 butterfly operation. The butterfly any-integer radix operation can be processed through the addition-and-subtraction and the coefficient multiplication. The coefficient multiplication can be carried out in the multiplication mode of CORDIC. Therefore, the any-integer radix butterfly operation is possible with only the CORDIC.

The processor of the first related art adopts the CORDIC-PE as a basic operational circuit. In the processor, two input addition-and-subtraction for butterfly operation requires one CORDIC operation involving iterative shift addition-and-subtraction with the same number of steps as the required bit accuracy(n) shown in Equation (1). Therefore, the above-mentioned processor is inefficient. The scaling correcting process involved also increase operation complexity.

As a basic operational circuit in order to solve this problem, processor of a second related art adopts a basic operational circuit which have a butterfly operational circuit in addition to the CORDIC-PE (for example, refer to the non-patent literature 4 and the non-patent literature 5).

FIG. 11 shows a diagram of a processor shown in the second related art. A processor 2000 includes a butterfly operational circuit 2002 and the composition of a processor 1000 adopted by the first related art. The butterfly operational circuit 2002 carries out the butterfly operation whose radix is designated based on a radix changing control signal issued by a control circuit 1001. Here, annotation of symbols in FIG. 11 is the same as FIG. 7.

CITATION LIST

Non Patent Literature

[NPL1]: Heyne, B., Buecker, M., and Goetze, J.: Implementation of a CORDIC Based FFT on a Reconfigurable Hardware Accelerator, in: 3rd Karlsruhe Workshop on Software Radios, 2004.
[NPL2]: M. Sima and M. McGuire, "Embedded Reconfigurable Solution for OFDM Detection over Fast Fading Radio Channels," in Proc. the IEEE Workshop on Signal Processing Systems (SiPS 2007). Shanghai, China, October 2007, pp. 13-18.
[NPL3]: S. Winograd, "On Computing the Discrete Fourier Transform", Proc. National Academy of Sciences, USA, 73, 1976, April, pp. 1006-1006.
[NPL4]: Sarmiento, R.; de Armas, V.; Lopez, J. F.; Montiel-Nelson, J. A.; Nunez, A.; "A CORDIC processor for FFT computation and its implementation using gallium arsenide technology", Very Large Scale Integration (VLSI) Systems, IEEE Transactions on Volume: 6, Issue: 1, 1998, Page (s): 18-30.

[NPL5]: Despain, A. M., "Fourier Transform Computers Using CORDIC Iterations", Computers, IEEE Transactions on Volume: C-23, Issue 10, 1974, Page (s): 993-1001

SUMMARY OF INVENTION

Technical Problem

The processor shown in the first related art requires one CORDIC operation involving iterative shift addition-and-subtraction with the same number of steps as the required bit accuracy(n) for one butterfly operation. Therefore, the processor is inefficient. The processor shown in the first related art may have to correct the scaling in some cases. In this case, since a volume of operations of the processor becomes increasing, the efficiency of processor becomes worse.

The processor shown in the second related art includes the butterfly operational circuit and the CORDIC circuit. The processor makes the butterfly operational circuit idle at a process other than the DFT operation.

It is a main object of the present invention to provide a processor carrying the DFT operation efficiently without making a part of the basic operational circuit idle even at a process other than the DFT operation, in order to solve the problems mentioned above.

Solution to Problem

A processor of the present invention, includes:

operation means including a plurality of shift addition-and-subtraction means which are connected so as to be able to carry out CORDIC (COordinate Rotation DIgital Computer) operation and each of which carries out a shift addition-and-subtraction process in butterfly operation including the shift addition-and-subtraction process composed of one or more one stages; and control means which instructs the operation means to carry out the CORDIC operation or the butterfly operation based on a plurality of data received from an outside.

An operating method of the present invention, wherein based on plural data received from an outside, by a processor including operation means which has a plurality of shift addition-and-subtraction means connected so as to be able to carry out CORDIC operation, the shift addition-and-subtraction means carries out a shift addition-and-subtraction process in a butterfly operation including the shift addition-and-subtraction processes composed of one or more than one stages.

Advantageous Effects of Invention

According to the present invention, it is possible to carry out the DFT operation efficiently without making a part of the basic operational circuit idle even at a process other than the DFT operation.

DESCRIPTION OF EMBODIMENTS

An exemplary embodiment according to the present invention will be described with reference to drawings.

Figure 1:
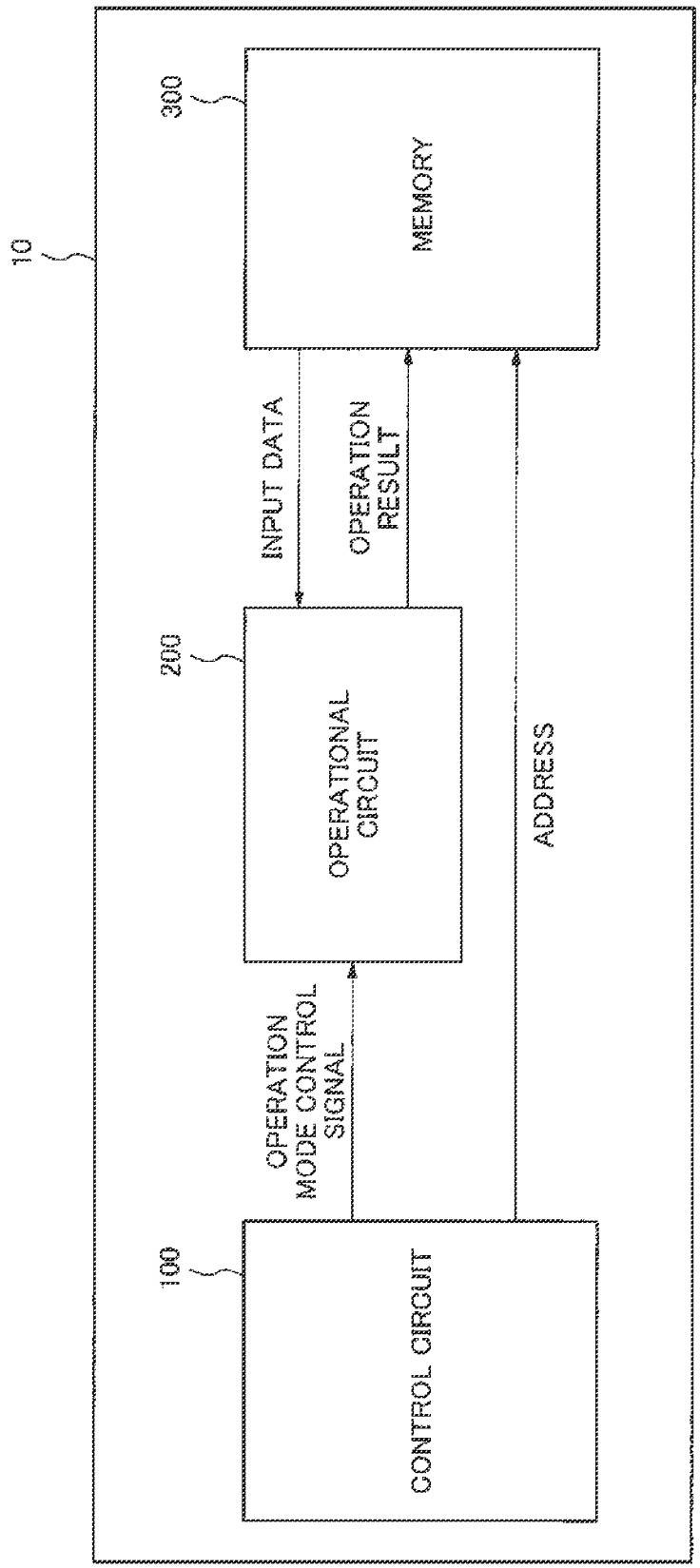
FIG. 1 is a block diagram showing an exemplary embodiment of a processor according to the present invention.

FIG. 1 is a block diagram showing an exemplary embodiment of a processor according to the present invention. A processor 10 includes a control circuit 100, a CORDIC and butterfly operational circuit (hereinafter, abbreviated as a operational circuit) 200, and a memory 300. The control circuit 100 and the memory 300 are corresponding to a control means (control unit) according to the present invention. The operational circuit 200 is corresponding to an operation means (operation unit) according to the present invention.

The control circuit 100 outputs address information on an input data and address information on an operation result to the memory 300.

The control circuit 100 outputs an operational mode control signal to the operational circuit 200. The operational mode control signal includes either information about a CORDIC operational mode (mode of carrying out the CORDIC operation) or information about a butterfly operational mode (mode of carrying out the butterfly operation). When the operational mode control signal includes the information about the butterfly operational mode, the operational mode control signal includes also information about the radix of the butterfly operation.

The memory 300 stores data from an outside. For an example, the memory 300 stores operands for CORDIC calculation. The operands are data which represents vector data $[x(0)$ and $y(0)]'$ and a rotation angle $z(0)$. For other example, the memory 300 stores operands for the butterfly operation. The operands represent N-points (N: integer) discrete periodic complex signal. The memory 300 stores real part data $Re\{x(0)\}, Re\{x(1)\}, \ldots, Re\{x(N)\}$ of the discrete periodic signal, and imaginary part data $Im\{x(0)\}, Im\{x(1)\}, \ldots, Im\{x(N)\}$ of the discrete periodic signal.

The memory 300 reads 3*M (M: parallel number) input data for the operational circuit 200 based on the address information from the control circuit 100. The memory 300 writes 3*M operation results of the operational circuit 200 based on the address information from the control circuit 100.

M is a positive integer indicating number of the CORDIC operations which the operational circuit 200 is able to carry out in parallel. That is, 3*M corresponds to number of input data for a shift addition-and-subtraction circuit (shift addition-and-subtraction unit (shift addition-and-subtraction means); hereinafter, abbreviated as a shift circuit) 220 (refer to FIG. 2) of the operational circuit 200.

According to the exemplary embodiment described in the following, an example that the parallel number M is 2 will be explained mainly. However, the number of the CORDIC operations which the operation unit (the operational circuit 200) is able to carry out in parallel is not limited to 2 according to the present invention.

The operational circuit 200 switches between the CORDIC operation mode and the butterfly operational mode based on the operational mode control signal from the control circuit 100. Then, the operational circuit 200 operates the input signal from the memory 300 in the switched operational mode. And then, the operational circuit 200 outputs the operation result to the memory 300.

In the CORDIC operational mode, the operational circuit 200 carries out an operation of the multiplication and division, an operation of the trigonometric function, an operation of the exponential and the logarithmic functions and an operation of the hyperbolic function by switching the Rotation mode or the Vectoring mode and by changing coordinate system. When the parallel number M is 2, the operational circuit 200 may carry out two CORDIC operations in parallel.

In case of the butterfly operational mode, the operational circuit 200 carries out the butterfly operation with specified radix. When M is 2, the operational circuit 200 can carry out the butterfly operation whose radix is not larger than 5.

Figure 2:
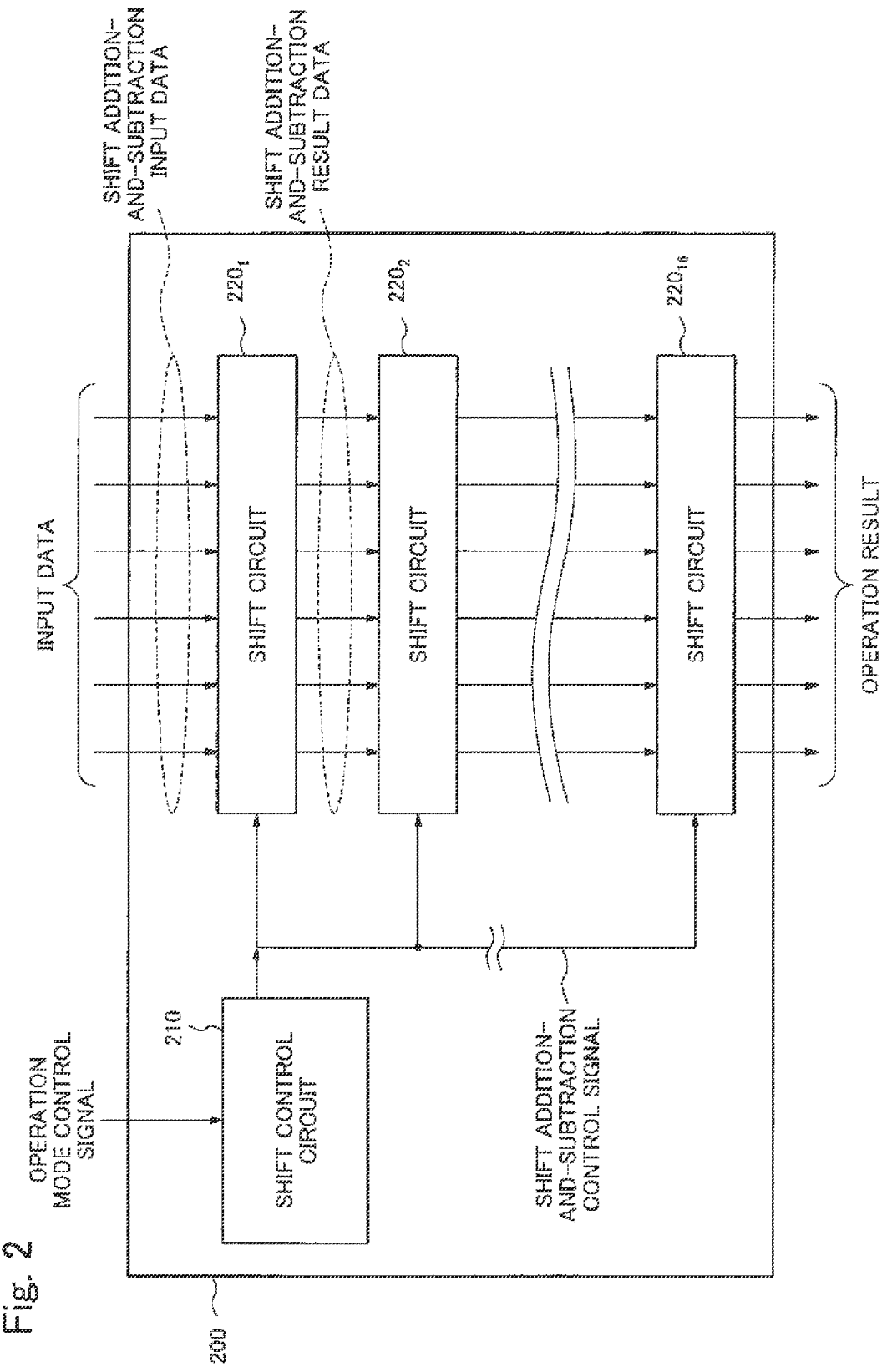
FIG. 2 is a block diagram showing an example of a CORDIC and butterfly operational circuit in the processor according to the exemplary embodiment of the present invention.

FIG. 2 shows an example of composition of the operational circuit 200. Here, according to the exemplary embodiment, it is assumed that CORDIC operation precision is 16 bits. However, the CORDIC operation precision of the operation unit according to the present invention is not limited to 16 bits.

According to FIG. 2, the operational circuit 200 includes a shift addition-and-subtraction control circuit (shift addition-and-subtraction control unit (shift addition-and-subtraction control means); hereinafter, abbreviated as a shift control circuit) 210, and 16 shift circuits $220_1$ to $220_{16}$ (called collectively as a shift circuit 220).

The shift control circuit 210 provides the shift circuits $220_1$ to $220_{16}$ with a shift addition-and-subtraction control signal based on the operation mode control signal from the control circuit 100. The shift addition-and-subtraction control signal controls behavior of the shift circuits $220_1$ to $220_{16}$ based on the operational mode specified by operation mode control signal.

Specifically, in the case that the shift circuits $220_1$ to $220_{16}$ operates at CORDIC operational mode, the shift control circuit 210 provides the shift circuit 220 with the shift addition-and-subtraction control signal containing the following control information. The control information represents number of bit-shifts, a kind of the coordinate system, information indicating the Rotation mode or the Vectoring mode, or the like.

The butterfly operation can be carried out by single or multiple stages of shift addition-and-subtraction operations. In case that the shift circuits $220_1$ to $220_{16}$ operates at the butterfly operational mode, the shift control circuit 210 provides the shift addition-and-subtraction control signal which direct the shift circuit 220 to perform one stage of specified radix butterfly operation.

For example, the power-of-2 radix butterfly operation can be carried out by single or multiple stages of shift addition-and-subtraction operations. In case that the shift circuits $220_1$ to $220_{16}$ operates at the power-of-2 radix butterfly operational mode, the shift control circuit 210 provides the shift circuit 220 with the shift addition-and-subtraction control signal containing the following control information. The control information specifies a combination of operands for addition-and-subtraction operations in accord with radix.

For example, the butterfly operation whose radix is not power of 2 cam be decomposed into a plurality of stages, including the addition-and-subtraction and a coefficient multiplication. The coefficient multiplication can be implemented by repetitive shift operation process.

In case that the operational mode of the shift circuits $220_1$ to $220_{16}$ is the butterfly operation whose radix is not power of 2, the shift control circuit 210 provides each the shift circuit 220 with the shift addition-and-subtraction control signal including the following control information. The control information is the number of bit-shifts for the coefficient multiplication based on the radix.

When the double of the radix is larger than the number of input data for the shift circuit 220 (3*M), the shift control circuit 210 controls each shift circuit 220 as follows. That is, each the shift circuit 220 carries out the shift addition-and-subtraction process at each stage for the real part data and the imaginary part in different cycle. For example, each the shift circuit 220 carries out the process for the real part data in an even cycle, and carries out the process for the imaginary part data in an odd cycle.

When a coefficient is the imaginary number in the coefficient multiplication in the butterfly operation, the shift control circuit 210 provides each the shift circuit 220 with the shift addition-and-subtraction control signal including the following control information. The control information indicates to instruct any one of the shift circuits 220 operating coefficient multiplication to switch between the real part data and the imaginary part data of the coefficient of the imaginary number.

When the real part data is processed at the even cycle and the imaginary part data is processed at the odd cycle, the shift control circuit 210 provides each of the shift circuit 220 with the shift addition-and-subtraction control signal including the following control information. The control information indicates to instruct any one of the shift circuit 220 operating coefficient multiplications to switch between the real part data and the imaginary part data which is operands for the coefficient multiplication of the imaginary number.

Next, an example of configuration of the shift circuit 220 will be described in detail.

As shown in FIG. 2, the shift circuits $220_1$ to $220_{16}$ are connected in series. Each of the shift circuit 220 carries out the shift addition-and-subtraction process on 3*M input data, and outputs the 3*M result data.

In the exemplary embodiment, it is assumed that M is 2. In this case, the shift circuit $220_1$ receives first to sixth shift addition-and-subtraction input data from the memory 300. Then, the shift circuit $220_1$ carries out the shift addition-and-subtraction process based on the first to the sixth shift addition-and-subtraction input data, and outputs first to sixth shift addition-and-subtraction result data to the shift circuit $220_2$.

Similarly, the shift circuits $220_2$ to $220_{15}$ carry out the shift addition-and-subtraction process respectively through using the first to the sixth received shift addition-and-subtraction result data as the shift addition-and-subtraction input data. Then, the shifting circuits $220_2$ to $220_{15}$ output the first to the sixth shift addition-and-subtraction result data to the next stage shift circuits $220_3$ to $220_{16}$ respectively.

Similarly, the shift circuit $220_{16}$ carries out the shift addition-and-subtraction process by the first to the sixth shift addition-and-subtraction result data from the shift circuit $220_{15}$, as the shift addition-and-subtraction input data. Then, the shift circuit $220_{16}$ outputs the first to the sixth shift addition-and-subtraction result data to the memory 300 as the operation result of the operational circuit 200.

Figure 3:
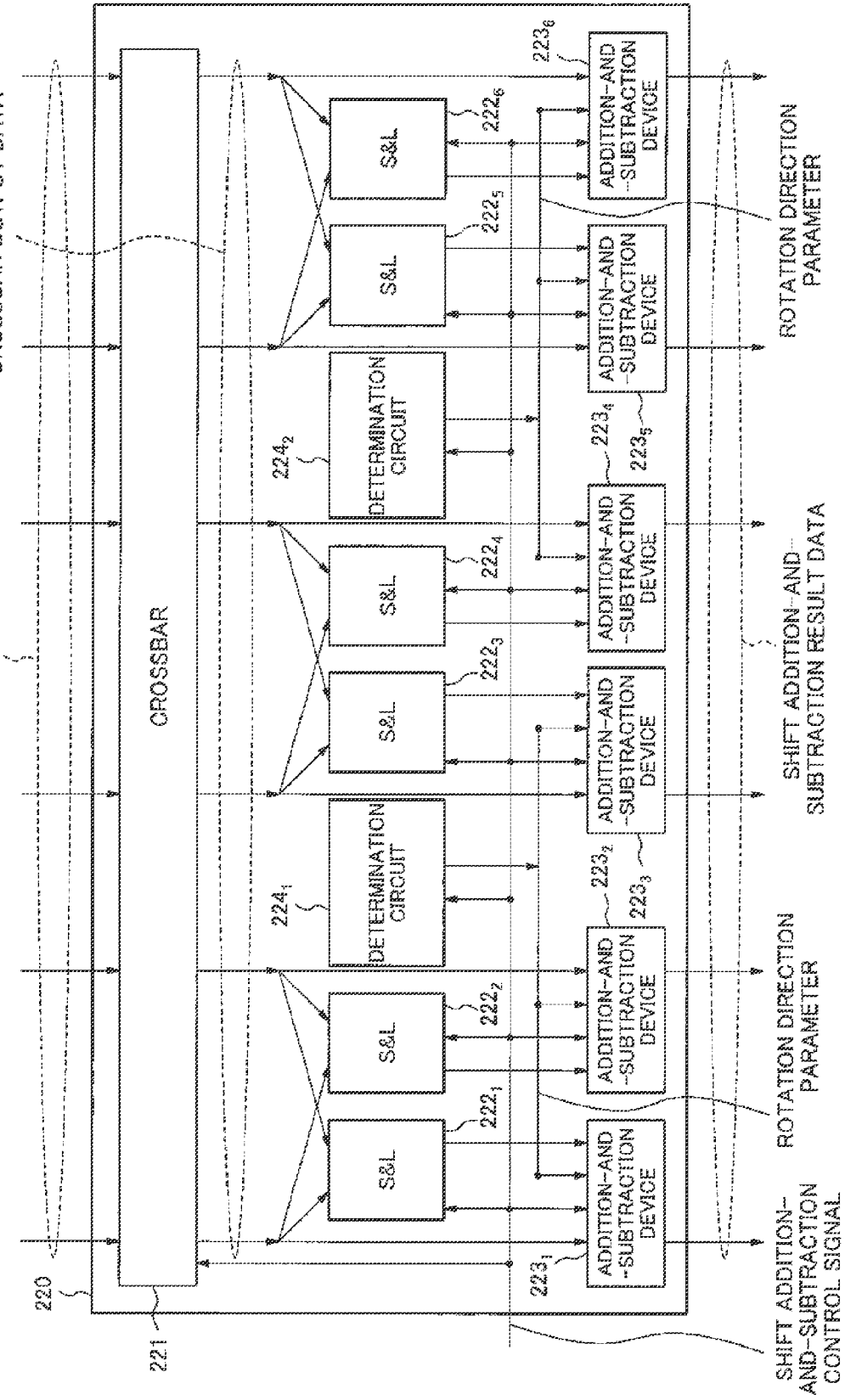
FIG. 3 shows an example of a shift addition-and-subtraction processing circuit in the CORDIC and butterfly operational circuit according to the exemplary embodiment of the present invention.

FIG. 3 shows an example of the composition of the shift circuit 220. According to FIG. 3, the shift circuit 220 includes a crossbar 221, six shifter and LUTs (hereinafter, abbreviated as S&L) $222_1$ to $222_6$, six addition-and-subtraction devices $223_1$ to $223_6$ and two rotation direction determination circuits (hereinafter, abbreviated as judgment circuit) $224_1$ and $224_2$. Here, LUT is an abbreviation of Look Up Table. S&Ls $222_1$ to $222_6$ are called collectively as S&L 222. The addition-and-subtraction devices $223_1$ to $223_6$ are called collectively as an addition-and-subtraction device 223. The judgment circuits $224_1$ and $224_2$ are called collectively as a judgment circuit 224.

The crossbar 221 receives the first to the sixth shift addition-and-subtraction input data and outputs first to sixth crossbar output data. At this time, the crossbar 221 outputs the first to the sixth shift addition-and-subtraction input data as the first to the sixth crossbar output data after replacing designated data out of the first to the sixth addition-and-subtraction input data based on the shift addition-and-subtraction control signal.

The crossbar 221 can swap between any data which is received in current cycle and any data which is received indifferent cycle and output swapped data. For example, the crossbar 221 select output data among 12 input data received at the even cycle and the odd cycle based on the addition-and-subtraction control signal, S&Ls $222_1$ to $222_6$ carry out a process designated by the shift addition-and-subtraction control signal to the first to the sixth crossbar output data, and outputs the processed data to the corresponding addition-and-subtraction devices $223_1$ to $223_6$ as first to sixth S&L output data respectively.

S&L 222 has LUT (Look Up Table) for the CORDIC operation. LUT holds micro rotation angle $\alpha_j$ for each coordinate system of the CORDIC operation. $\alpha_j$ is micro rotation angle corresponding to iteration count j (j=0, . . . , 15) of the shift addition-and-subtraction process.

A process carried out by S&L 222 will be described with referring to S&L $222_1$ as an example. S&L $222_1$ selects one out of the first and the second crossbar output data, and carries out the bit-shift to the selected data, and outputs the shifted data to the addition-and-subtraction device $223_1$.

When S&L $222_1$ processes z data expressed in Equation (1), S&L $222_1$ calls the micro rotation $\alpha_j$ and outputs the micro rotation $\alpha_j$ to the addition-and-subtraction device 2231. Here, $\alpha_j$ is corresponding to the coordinate system designated by the shift addition-and-subtraction control signal, from the inner LUT, Here, based on the control information embedded in the shift addition-and-subtraction control signal, S&L 222 determines the number of the bit-shifts, and data which is called from LUT.

A process carried out by each of S&L $222_2$ to $222_6$ is also the same as the process carried out by S&L $222_1$.

When carrying out the CORDIC operation, the judgment circuits $224_1$ to $224_2$ generates rotation direction parameter $\sigma_j$ based on Equation (6), and output it to the addition-and-subtraction devices $223_1$ to $223_6$. According to the shift addition-and-subtraction control signal, the judgment circuit 224 selects either the Rotation mode or the Vectoring mode.

Based on the shift addition-and-subtraction control signal, the addition-and-subtraction devices $223_1$ to $223_6$ carry out the addition-and-subtraction to the first to the sixth crossbar output data and the output data of the S&L $222_1$ to $222_6$. Then, the addition-and-subtraction devices $223_1$ to $223_6$ output a result of the process to the shift circuit 220 as the first to the sixth shift addition-and-subtraction result data. The shift circuit 220 carries out the following process.

An example of an operation of the processor 10 will be described below. The operations of the processor 10 carrying out the CORDIC operation and the radix-2, radix-3 and radix-5 butterfly operations will be described in the exemplary embodiment.

<Operation Related to the CORDIC Operation>

First of all, the operation of the processor 10 which carries out the CORDIC operation will be described.

Firstly, the memory 300 reads three data representing the vector data [x(0), y(0)]' and about the rotation angle z(0) based on the address designated by the control circuit 100. Then, the memory 300 outputs these data to the operational circuit 200.

Next, the shift circuits $220_1$ to $220_{16}$ carry out successively a rotation process in the shift addition-and-subtraction process expressed in Equation (1).

Here, a the shift circuit $220_{j+1}$ (j=0, . . . , 15) carries out th following process.

Firstly, data {x(j), y(j), z(j)} from the memory 300 or from the shift circuit $220_j$, is inputted into the crossbar 221 of the shift circuit $220_{j+1}$.

Next, the crossbar 221 outputs the first to the third input data as the first to the third crossbar output data as it is.

Next, S&L $222_1$ carries out right bit-shift by j+1 bits to the second crossbar output data corresponding to the y component and outputs the shifted data to the addition-and-subtraction device 2231.

S&L $222_2$ carries out the right bit-shift by j+1 bits to the first crossbar output data corresponding to the x component and outputs the shifted data to the addition-and-subtraction device $223_2$.

S&L $222_3$ calls the micro rotation angle $\alpha_j$, from the inner LUT based on the coordinate system of the CORDIC operational mode according to the shift addition-and-subtraction control signal and outputs the angle to the addition-and-subtraction device 2233.

The judgment circuit $224_1$ generates the rotation direction parameter $\sigma_j$ according to Equation (6) based on the Rotation mode or the Vectoring mode based on the shift addition-and-subtraction control signal. Then, the judgment circuit $224_1$ outputs it to the addition-and-subtraction devices $223_1$ to $223_6$.

Next, the addition-and-subtraction devices $223_1$ to $223_3$ carry out the addition-and-subtraction shown in Equation (1) based on the output data of S&L $222_1$ to $222_3$, the output data of the crossbar 221, and the output data of the judgment circuit $224_1$ respectively. As a result, the addition-and-subtraction devices $223_1$ to $223_3$ output data {x(j+1), y(j+1), z(j+1)}.

The addition-and-subtraction $223_1$ chooses operation between addition and subtraction based on the coordinate system of the CORDIC operational mode specified by the shift addition-and-subtraction control signal.

As mentioned above, the shift circuits $220_1$ to $220_{16}$ carry out the rotation process successively.

Then, the shift circuit $220_{16}$ outputs the result data {x(16), y(16), z(16)} as the output data of the operational circuit 200.

Next, the memory 300 writes in the output data of the operational circuit 200 based on the address designated by the control circuit 100.

As a result, the processor 10 completes the operation related to the CORDIC operation.

Here, in the processor 10, the operational circuit 200 can carry out two CORDIC operations in parallel through inputting not only the three input data {x(0), y(0), z(0)} but also other three input data {x1(0), y1(0), z1(0)}.

In this case, the shift circuit $220_1$ receives not only the first to the third shift addition-and-subtraction input data but also the fourth to the sixth shift addition-and-subtraction input data. The shift circuits $220_1$ to $220_{16}$ carry out the rotation process to the fourth to the sixth shift addition-and-subtraction input data similarly to the rotation process to the first to the third input data.

<Operation Related to Radix-2 Butterfly Operation>

Next, an operation of the processor 10 related to the radix-2 butterfly operation will be described referring to a schematic diagram shown in FIG. 4.

Figure 4:
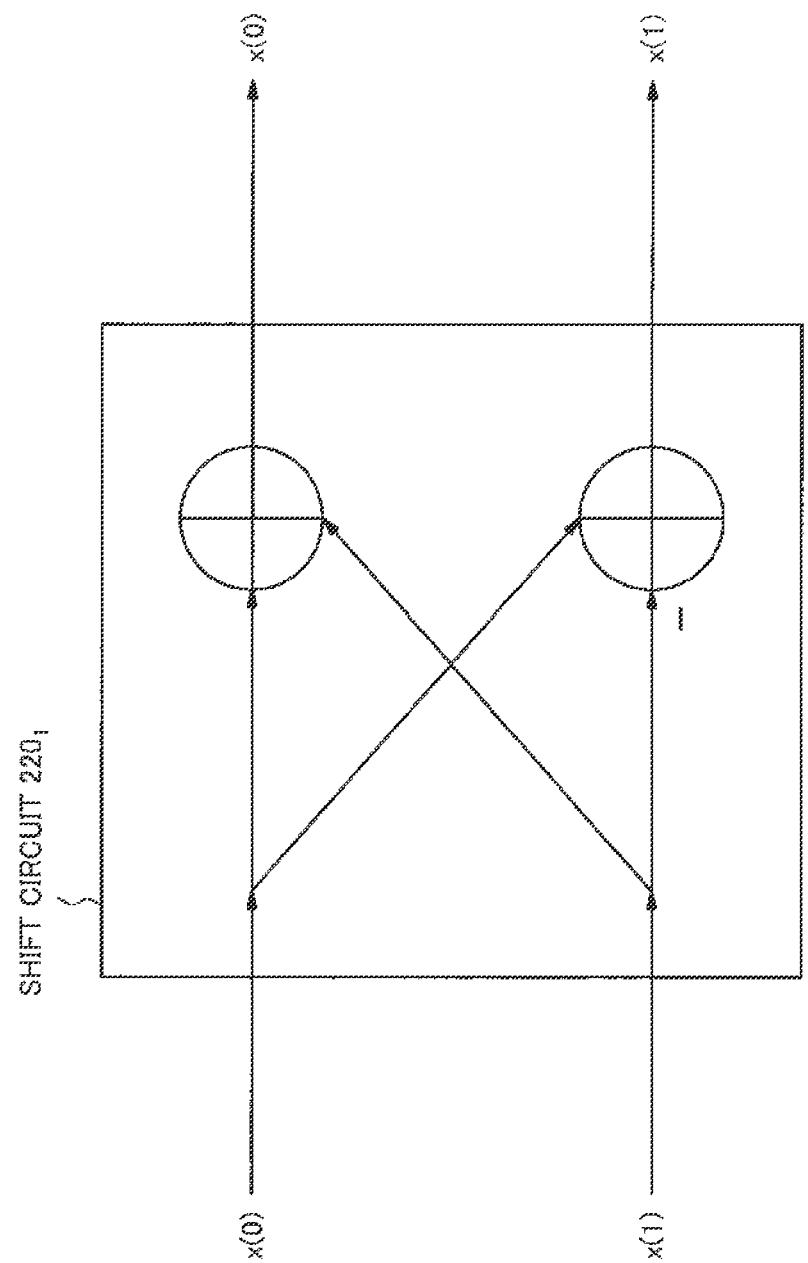
FIG. 4 is a diagram explaining a radix-2 butterfly operation on the processor according to the exemplary embodiment of the present invention.

In FIG. 4, {x(0), x(1)} indicate complex number operand for radix-2 butterfly operation. {X(0), X(1)} indicates a complex number operation result. As shown in FIG. 4, the radix-2 butterfly operation on two complex number data is carried out in one-stage addition-and-subtraction process. FIG. 4 shows that the shift circuit $220_1$ carries out the one-stage addition-and-subtraction process.

In the radix-2 butterfly operation 2, the shift circuit $220_1$ of the operational circuit 200 receives real part data {Re{x(0)}, Re{x(1)}} as the first and the second shift addition-and-subtraction input data based on control by the control circuit 100. The shift circuit $220_1$ receives imaginary part data {Im{x(0)}, Im{x(1)}} as the third and the fourth shift addition-and-subtraction input data.

Next, the control circuit 100 provides the operational circuit 200 with the operational mode control signal including information on the radix-2 butterfly operation.

In the operational circuit 200, the shift control circuit 210 provides the shift circuit $220_1$ with the shift addition-and-subtraction control signal based on the operational mode control signal. The shift addition-and-subtraction control signal includes control information indicating a combination of two real part data and a combination of two imaginary part data for the addition-and-subtraction. The shift control circuit 210 provides the shift circuit $220_2$ to $220_{16}$ with the shift addition-and-subtraction control signal. The shift addition-and-subtraction control signal includes information instructing to output the shift addition-and-subtraction input data as the shift addition-and-subtraction result data as it is.

Hereinafter, an operation of the shift circuit 220 based on the shift addition-and-subtraction control signal will be described.

The crossbar 221 of the shift circuit $220_1$ outputs the first and the second shift addition-and-subtraction input data as the first and the second crossbar output data as it is.

Next, S&L $222_1$ outputs the second crossbar output data indicating Re{x(1)} to the addition-and-subtraction device $223_1$ without carrying out the shift process. S&L $222_2$ outputs the first crossbar output data indicating Re{x(0)} to the addition-and-subtraction device $223_2$ without carrying out the shift process.

Next, the addition-and-subtraction devices $223_1$ and $223_2$ carry out the addition process and the subtraction process to the two real part data, and output a result of this process as the first and the second shift addition-and-subtraction result data.

Afterward, the shift circuit $220_1$ carries out the addition-and-subtraction to the third and the fourth shift addition-and-subtraction input data corresponding to the imaginary part, in addition to the first and the second shift addition-and-subtraction input data corresponding to the real part with S&Ls $222_3$ and $222_4$ and the addition-and-subtraction devices $223_3$ and $223_4$. Then, the shift circuit $220_1$ outputs a result of the process as the third and the fourth shift addition-and-subtraction result data.

Afterward, the shift circuits $220_2$ to $220_{16}$ output successively the first to the fourth shift addition-and-subtraction result data from the shift circuit $220_1$, as it is. That is, the shift circuit $220_{16}$ outputs the first to the fourth shift addition-and-subtraction result data from the shift circuit $220_1$ as the output data of the operational circuit 200.

Then, the memory 300 writes the output data of the operational circuit 200 based on the address which is designated by the control circuit 100.

As a result, the processor 10 completes the operation related to the radix-2 butterfly operation.

<Operation Related to Radix-3 Butterfly Operation>

Next, an operation of the processor 10 carrying out the radix-3 butterfly operation will be described by a diagram of FIG. 5.

Figure 5:
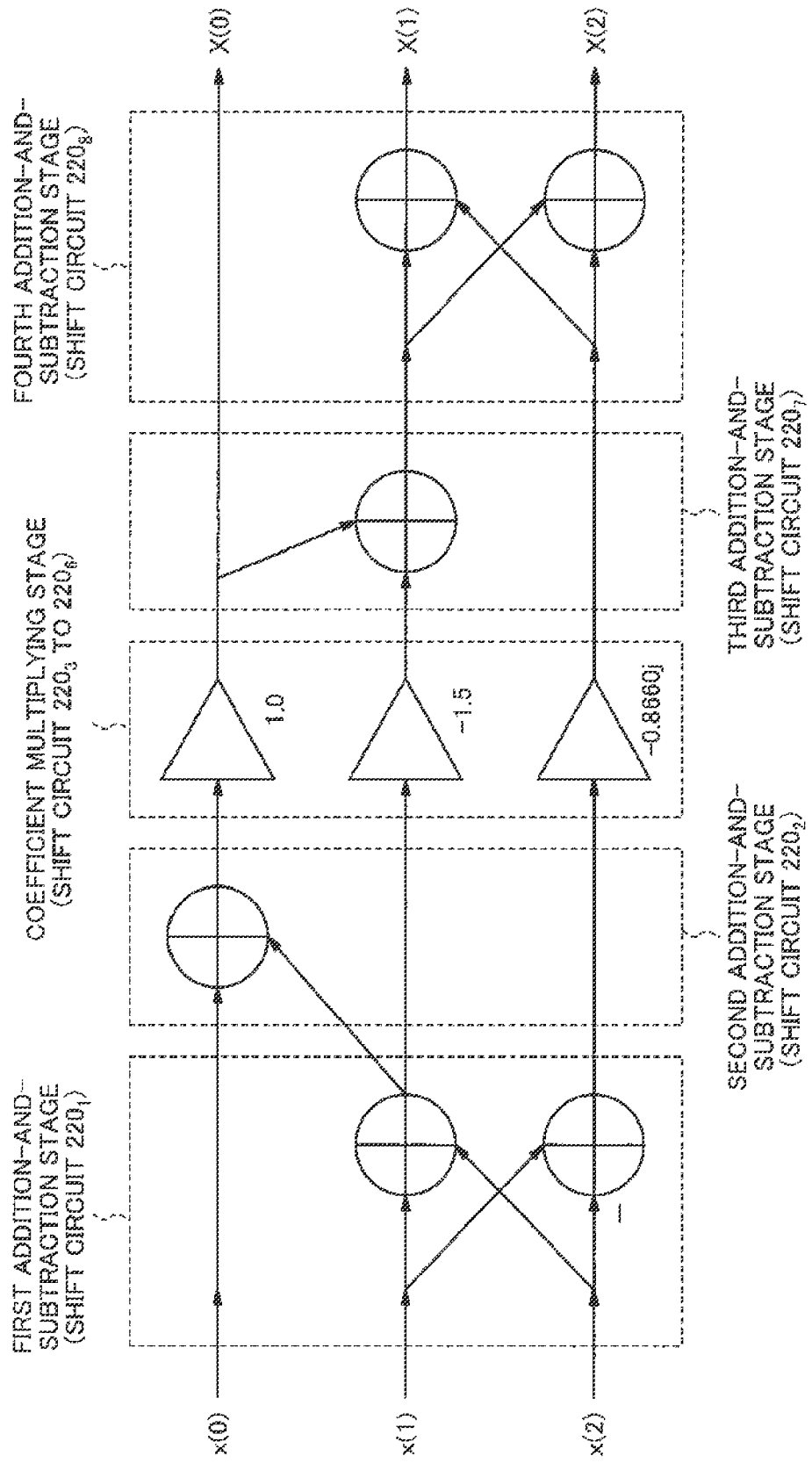
FIG. 5 is a diagram explaining a radix-3 butterfly operation on the processor according to the exemplary embodiment of the present invention.

In FIG. 5, {x(0), x(1), x(2)} indicate complex number operand for radix-3 butterfly operation. {X(0), X(1), X(2)} indicates a complex number operation result. As shown in FIG. 5, the radix-3 butterfly operation in the addition-and-subtraction including a first to a fourth addition-and-subtraction stages, and the coefficient multiplication including a coefficient multiplication stage. It is known that the coefficient multiplication is realized through iterating the shift addition-and-subtraction.

In FIG. 5, the shift circuit $220_1$ carries out a process of the first addition-and-subtraction stage. The shift circuit $220_2$ carries out a process of the second addition-and-subtraction stage. The shift circuit $220_7$ carries out a process of the third addition-and-subtraction stage. The shift circuit $220_8$ carries out a process of the fourth addition-and-subtraction stage. The shift circuits $220_3$ to $220_6$ carry out a process of the coefficient multiplying stage.

In the radix-3 butterfly operation, firstly, the shift circuit $220_1$ of the operational circuit 200 receives real part data {Re{x(0)}, Re{x(1)}, Re{x(2)}} of {x(0), x(1), x(2)} as the first to the third shift addition-and-subtraction input data respectively based on the control by the control circuit 100. The shift circuit $220_1$ receives imaginary part data {Im{x(0)}, Im{x(1)}, Im{x(2)}} as the fourth to the sixth shift addition-and-subtraction input data.

The control circuit 100 provides the operational circuit 200 with the operational mode control signal about the radix-3 butterfly operation.

Afterward, the shift control circuit 210 provides the shift circuits $220_1$, $220_2$, $220_7$ and $220_8$ with the following shift addition-and-subtraction control signal. The shift addition-and-subtraction control signal includes information indicating a combination of the input data for the addition-and-subtraction at the first to the fourth addition-and-subtraction stages. The shift control circuit 210 provides the shift circuits $220_3$ to $220_6$ with the following shift addition-and-subtraction control signal. The shift addition-and-subtraction control signal specifies operands for coefficient multiplication and the number of the bit-shifts.

When a coefficient at the coefficient multiplying stage is the imaginary number such as 0.8660j ("j" means the imaginary unit) shown in FIG. 5, the shift addition-and-subtraction control signal includes information for instructing any one of the shift circuits $220_3$ to $220_6$ to switch between the imaginary part data and the real part data of the imaginary number at the coefficient multiplication.

Hereinafter, an operation of the shift circuit 220 based on the shift addition-and-subtraction control signal will be described.

(First Addition-and-Subtraction Stage)

Firstly, the shift circuit $220_1$ carries out a process of the first addition-and-subtraction stage.

That is, the shift circuit $220_1$ receives {Re{x(0)}, Re{x(1)}, Re{x(2)}} as the first to the third shift addition-and-subtraction input data. In the shift circuit $220_1$, the crossbar 221 rearranges the first to the third shift addition-and-subtraction input data, and outputs {Re{x(1)}, Re{x(2)}, Re{x(0)}} as the first to the third crossbar output data.

Afterward, in the shift circuit $220_1$, S&Ls $222_1$ and $222_2$, and the addition-and-subtraction devices $223_1$ and $223_2$ carry out the same process as the process in the radix-2 butterfly operation to {Re{x(1)}, Re{x(2)}} as the first and the second crossbar output data. The shift circuit $220_1$ outputs Re{x(0)} as the third crossbar output.

The shift circuit $220_1$ receives the imaginary part data {Im{x(0)}, Im{x(1)}, Im{x(2)}} as the fourth to the sixth input data.

In the shift circuit $220_1$, the crossbar 221, S&L 222 and the addition-and-subtraction device 223 carry out a process, which is the same as the process carried out to the real part data, to the imaginary part data.

(Second Addition-and-Subtraction Stage)

Next, the shift circuit $220_2$ carries out a process of the second addition-and-subtraction stage to the data outputted from the shift circuit $220_1$. That is, the shift circuit $220_2$ carries out the addition-and-subtraction of the second addition-and-subtraction stage to the data by the crossbar 221, S&L 222 and the addition-and-subtraction device 223.

(Coefficient Multiplying Stage)

Next, the shift circuits $220_3$ to $220_6$ carry out the coefficient multiplication at the coefficient multiplying stage. The shift addition-and-subtraction is iterated in the coefficient multiplication. The 16 bit precision is realized through carrying out four-stage (four steps) shift addition-and-subtraction.

For example, in the coefficient multiplication for multiplying a coefficient of −0.8660j shown in FIG. 5, the shift addition-and-subtraction is iterated as expressed in Equation (11).

$$-0.8660=(-1+2^{-3})*(1-2^{-7})*(1-2^{-9})*(1-2^{-12}) \quad (11)$$

The explanation is continued with focusing on the coefficient multiplication for multiplying the coefficient of −0.8660j.

According to the exemplary embodiment, real part of data multiplied with a coefficient of 1.0, a coefficient of −1.5 and a coefficient of −0.8660j respectively as shown in FIG. 5 are inputted into the shift circuit $220_3$ from the shift circuit $220_2$ as the first to the third shift addition-and-subtraction input data.

Furthermore, imaginary part of multiplied with the coefficient of 1.0, the coefficient of −1.5 and the coefficient of −0.8660j respectively as shown in FIG. 5 are inputted into the shift circuit $220_3$ from the shift circuit $220_2$ as the fourth to the sixth shift addition-and-subtraction input data.

Next, in the shift circuit $220_3$, the crossbar 221 switches between the third shift addition-and-subtraction input data and the sixth shift addition-and-subtraction input data. The third shift addition-and-subtraction input data is associated with the real part which is multiplied with the imaginary number coefficient of −0.8660j. The sixth shift addition-and-subtraction input data is associated with the imaginary part of data multiplied with the imaginary number coefficient of −0.8660j.

Afterward, in the shift circuit $220_3$, the S&L $222_3$ carries out the right bit-shift process by 3 bits, and outputs the processed data to the addition-and-subtraction device $223_1$.

The addition-and-subtraction device $223_3$ subtracts the third crossbar output data from the above-mentioned data from S&L $222_3$, and outputs a result of the operation to the shift circuit $220_4$.

According to the exemplary embodiment, the shift circuit $220_3$ switches between the real part (third shift addition-and-subtraction input data) and the imaginary part (sixth shift addition-and-subtraction input data) by the crossbar 221 as described above. As a result, the crossbar 221 does not switch between the real part and the imaginary part in the shift circuits $220_4$ to $220_6$.

In the coefficient multiplication for multiplying the coefficient of −0.8660j, the shift circuits $220_4$ to $220_6$ carry out the right bit-shift processes by 7 bits, 9 bits and 12 bits, and the subtraction processes respectively by S&L $222_3$ and the addition-and-subtraction device $223_3$.

Similarly, the shift circuits $220_3$ to $220_6$ carry out the multiplication processes multiplying the coefficient of 1.0 and the coefficient of −1.5 by the S&Ls $222_1$ and $222_2$, and the addition-and-subtraction devices $223_1$ and $223_2$.

(Third to Fourth Addition-and-Subtraction Stages)

Next, the shift circuits $220_7$ and $220_8$ carry out the addition-and-subtraction, which are at the third and the fourth stages respectively, like the shift circuits $220_1$ and $220_2$ carry out the addition-and-subtraction.

The shift circuits $220_9$ to $220_{16}$ output the first to the sixth shift addition-and-subtraction result data of the shift circuit $220_8$ as it is. That is, the shift circuit $220_{16}$ outputs the first to the sixth addition-and-subtraction result data of the shift circuit $220_8$ as the output data of the operational circuit 200 as it is.

Afterward, the memory 300 writes the output data of the operational circuit 200 based on the address according to the control circuit 100.

As a result, the processor 10 completes the operation related to the radix-3 butterfly operation.

<Operation Related to Radix-4 or Radix-5 Butterfly Operations>

Next, an operation of the processor 10 calculating the radix-4 and radix-5 butterfly operations will be described.

In the case of carrying out the radix-4 and radix-5 butterfly operations, respectively, the processor 10 carries out the butterfly operation in a plurality of cycles. The operation of the processor 10 is different from the operation related to the radix-3 butterfly operation.

In the radix-4 butterfly operation, number of the input data is 8 through adding number of the data for the real part and for the imaginary part together. In the radix-5 butterfly operation, number of the input data is 10 through adding number of the data for the real part and for the imaginary part together. According to the exemplary embodiment, the number of the input data of the operational circuit 200 is 3*M=6. The operational circuit 200 cannot process each of the radix-4- or radix-5 butterfly operations in only one cycle.

For this reason, the shift control circuit 210 divides the processes of the radix-4 or radix-5 butterfly operation into a process for the real part and a process for the imaginary part, and carries out the process for the real part and the process for the imaginary part in the cycles different to each other. For example, the operational circuit 200 carries out the process for the real part in an even cycle. The operational circuit 200 carries out the process for the imaginary part in an odd cycle.

When a coefficient at the efficient multiplying stage is the imaginary number, any one of the crossbar 221 of the shift circuit 220 switches between the real part and the imaginary part of the data multiplied with the coefficient of the imaginary number as mentioned above. The shift circuit 220 processes the coefficient multiplying stage. The real part data is inputted in the even cycle. The imaginary part data is inputted in the odd cycle.

With respect to the processes except for the above-mentioned process, the processor 10 carries out the shift addition-and-subtraction processes including the plural stages carrying out the radix-4 and radix-5 butterfly operations respectively, like the processor 10 carries out the shift addition-and-subtraction process in the radix-3 butterfly operation. Therefore, detailed description on the overlapping part is omitted.

Here, according to the exemplary embodiment, the number of the input data of the operational circuit 200 is assumed to be 6. As a result, the processor can carry out the two CORDIC operations in parallel. The processor can process the butterfly operation whose radix is up to 5. In contrast, when the number of the input data of the operational circuit 200 becomes increasing, and the shift addition-and-subtraction circuit (shift circuit) carries out a plurality of processes with the time division method, it is possible to increase the number of the CORDIC operations which the processor can carry out in parallel, and to increase the radix of the butterfly operation of the processor.

An effect of the processor according to the exemplary embodiment will be described in the following.

The processor according to the exemplary embodiment can process the DFT operation efficiently without making a part of the basic operational circuit idle, even if the processor carries out a process other than the DFT operation.

The reason is that a plurality of the shift addition and subtracting circuits (shift circuit) operating the CORDIC operation cooperatively carry out each of the stage of the shift addition-and-subtraction process in the butterfly operation. Therefore, it is unnecessary that the processor according to the exemplary embodiment carries out one CORDIC operation involving iterative shift addition-and-subtraction with the same number of steps as the required bit accuracy for each the addition-and-subtraction in the butterfly operation.

Another reason is that the processor according to the exemplary embodiment carries out the butterfly operation by the shift addition-and-subtraction circuit (shift circuit) operating the CORDIC operation. Therefore, it is unnecessary to install a circuit dedicated to butterfly operation. Accordingly, when carrying out a process other than the process of the butterfly operation, the butterfly operational circuit does not become idle.

Note, in the exemplary embodiment, the operational circuit 200 is able to realize the above-mentioned effect on the butterfly operation whose radix is predetermined without the shift control circuit 210

In this case, in each stage of the shift addition-and-subtraction process carrying out the predetermined-radix butterfly operation, a combination of the data for the addition-and-subtraction is predetermined. Even if the shift addition-and-subtraction process for the predetermined-radix butterfly operation includes the coefficient multiplication, the number of the bit-shifts in the shift operation realizing the coefficient multiplication is also predetermined. Accordingly, when the operational circuit 200 does not include the shift control circuit 210, each the shift circuit 220 performs data arrangement and bit-shift in predetermined way in the butterfly mode.

The processor according to the exemplary embodiment can carry out efficiently the butterfly operation of arbitrary radix without arranging beforehand the butterfly operational circuit corresponding to a kind of the radix which an application requires.

In contrast, in the processor shown in the second related art (processor which includes the circuit dedicated to butterfly operation in addition to the CORDIC circuit), it is necessary to prepare the butterfly operational circuit corresponding to a kind of the radix which the application requires. Therefore, the processor is inefficient. The processor according to the exemplary embodiment solves the problem.

That is, according to the exemplary embodiment, in the case of carrying out the power-of-2 radix butterfly operation, the shift control circuit (shift addition-and-subtraction control circuit) controls a combination of data for the addition-and-subtraction based on the radix for each of the shift circuit (shift addition-and-subtraction circuit). By virtue of the flexibility, it is unnecessary to install the butterfly operational circuit dedicated to a kind of the power-of-2 radix required by an application.

On the contrary, in the exemplary embodiment, in the case of carrying out the butterfly operation whose radix is not power of 2, the shift control circuit (shift addition-and-subtraction control circuit) controls a combination of the above-mentioned data of the addition-and-subtraction. Furthermore, the shift control circuit controls the number of the bit-shifts for the shift circuit (shift addition-and-subtraction circuit) operating the coefficient multiplication corresponding to the radix. The bit-shifts is corresponding to the radix. As a result, it is unnecessary to install the butterfly operational circuit dedicated to a kind of the not-power-of-2 radix required by an application.

Furthermore, in the case of carrying out the butterfly operation when 2*(radix) is larger than the number of the input data, the shift control circuit (shift addition-and-subtraction control circuit) controls the shift circuit (shift addition-and-subtraction circuit) at the shift addition-and-subtraction process related to the butterfly operation, to carry out the process for the real part data, and the process for the imaginary part data in the cycles different to each other.

According to the exemplary embodiment, the above-mentioned problem (problem that the processor becomes inefficient) is solved as described above.

The processor according to the exemplary embodiment can carry out efficiently the not-power-of-2 radix butterfly operation which includes the coefficient multiplication of the imaginary number. This reason is that the shift control circuit (shift addition-and-subtraction control circuit) carries out the control of switching between the real part and the imaginary part of data multiplied with the coefficient of the imaginary number for the shift circuit (shift addition-and-subtraction circuit) operating the coefficient multiplication.

Figure 6:
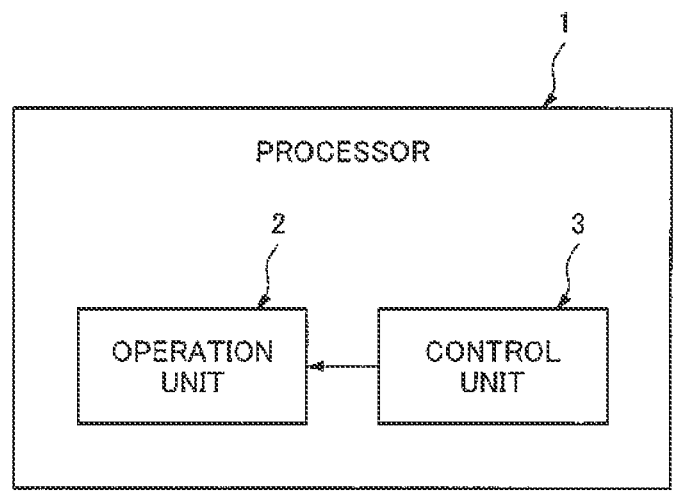
FIG. 6 is a block diagram showing another exemplary embodiment of the processor according to the present invention.
Figure 7:
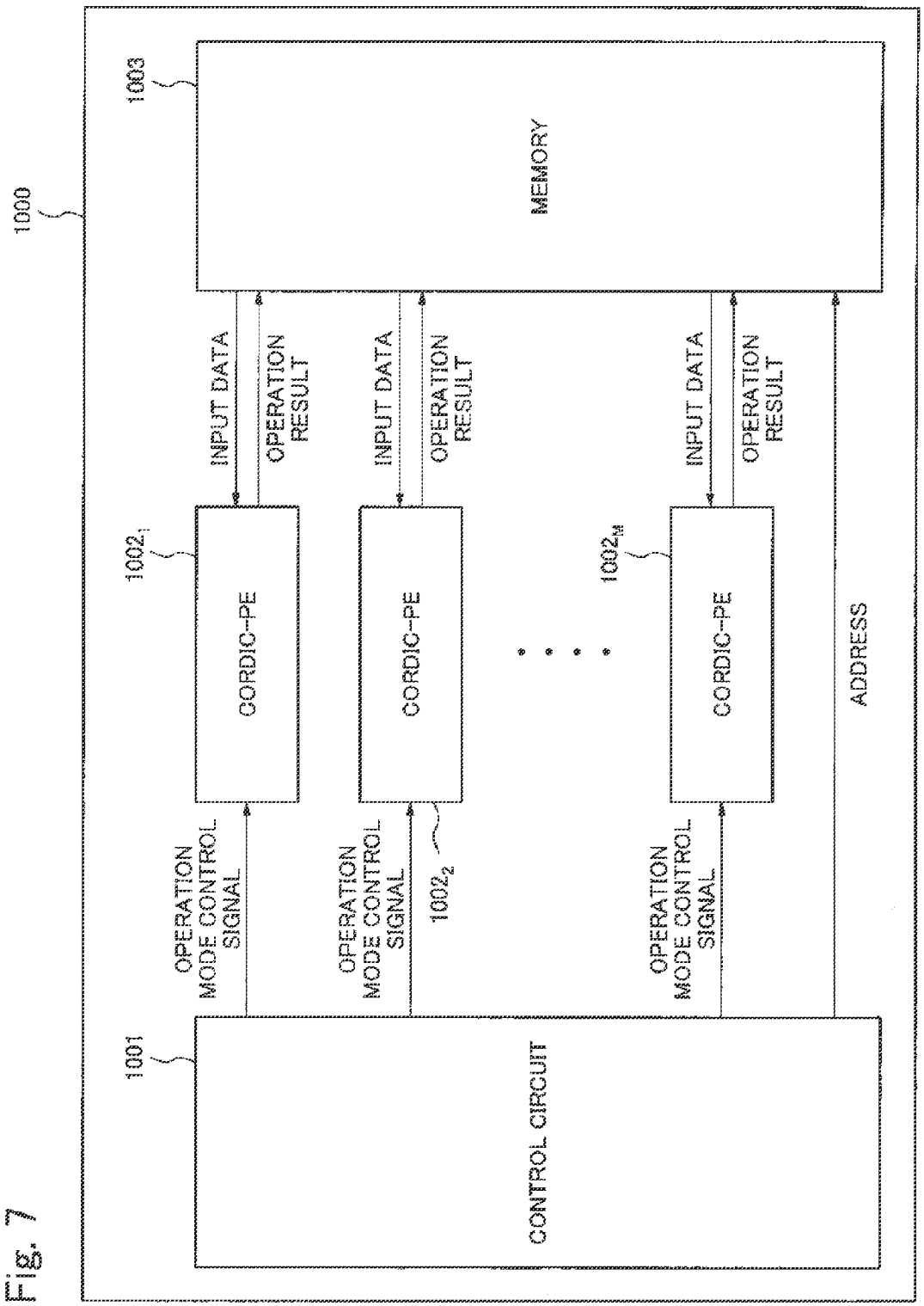
FIG. 7 is a schematic block diagram showing a diagram of a processor which uses the first related art.
Figure 8:
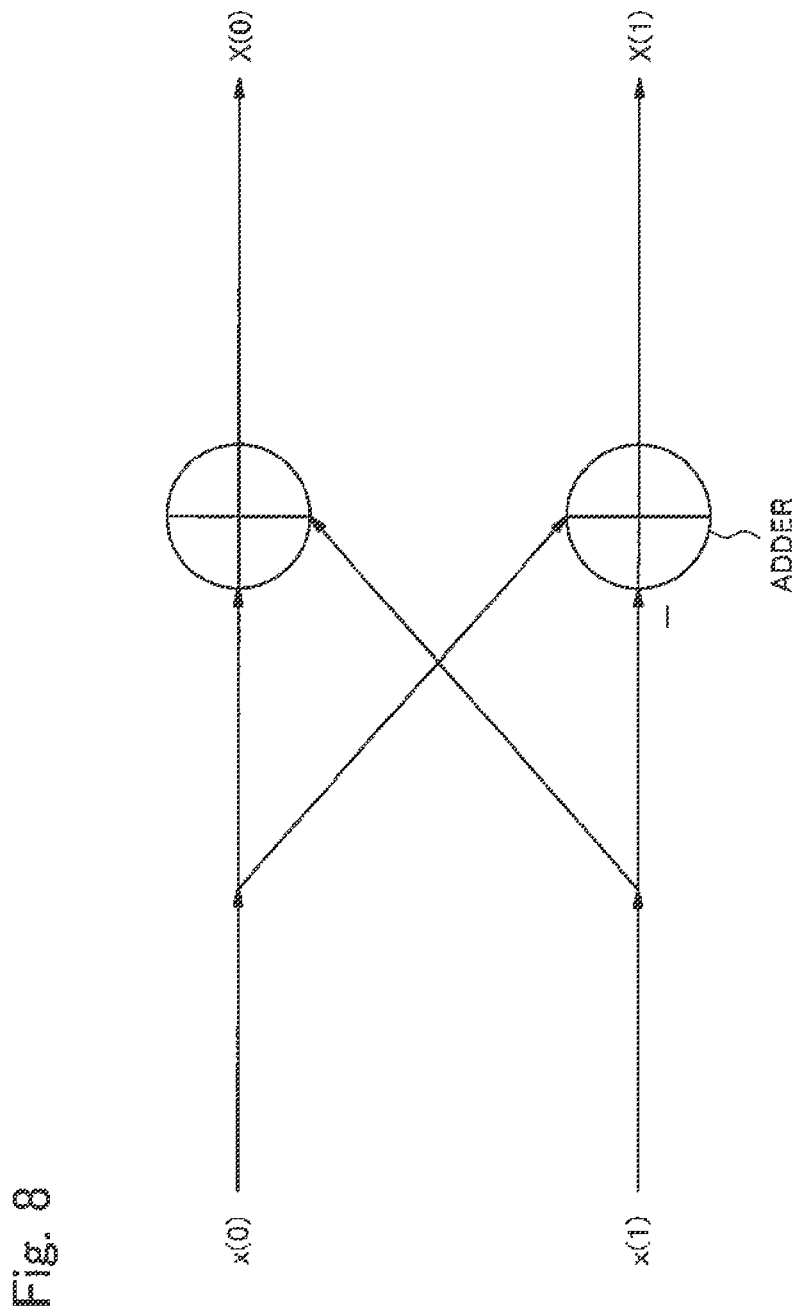
FIG. 8 is a schematic diagram explaining a radix-2 butterfly operation.
Figure 9:
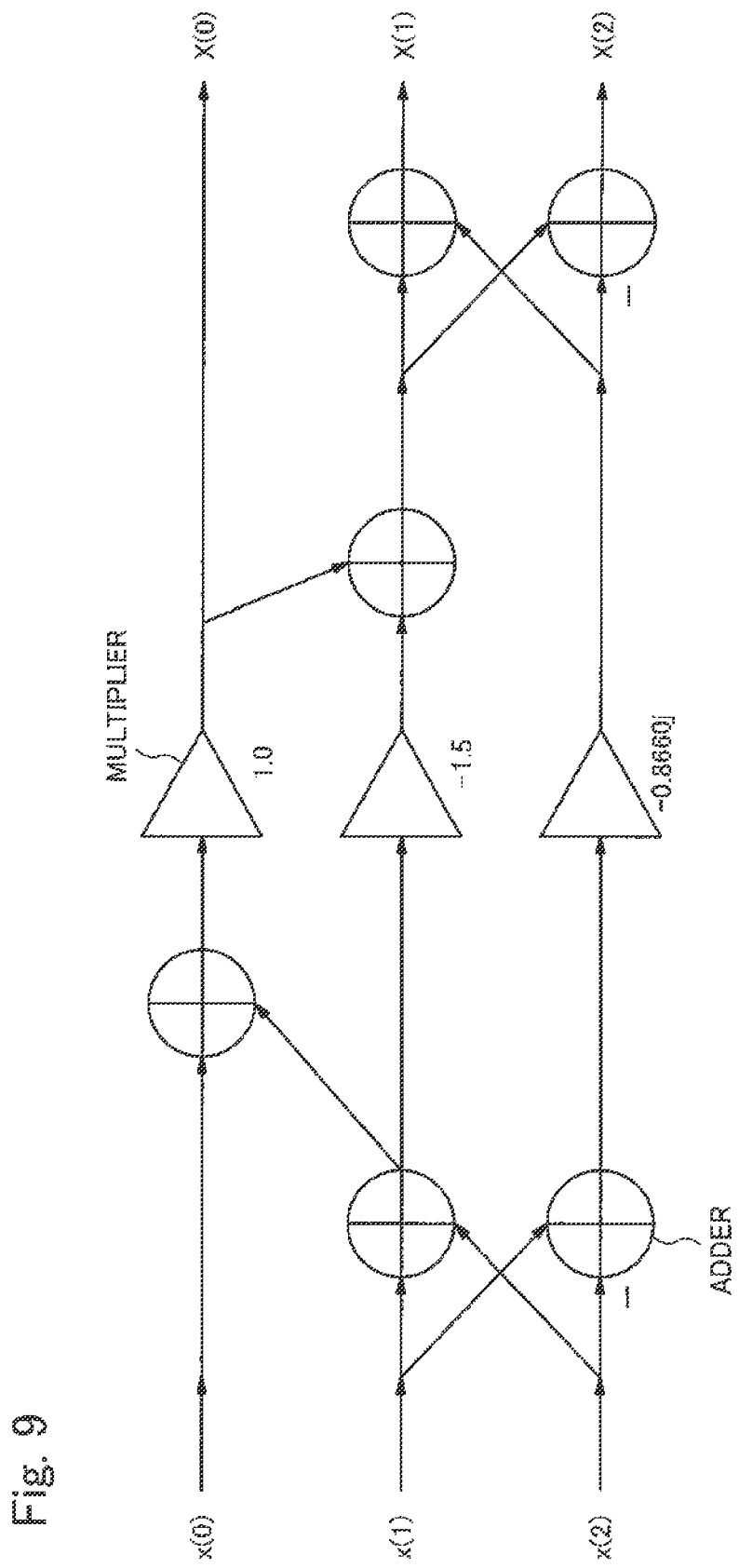
FIG. 9 is a schematic diagram explaining a radix-3 butterfly operation.
Figure 10:
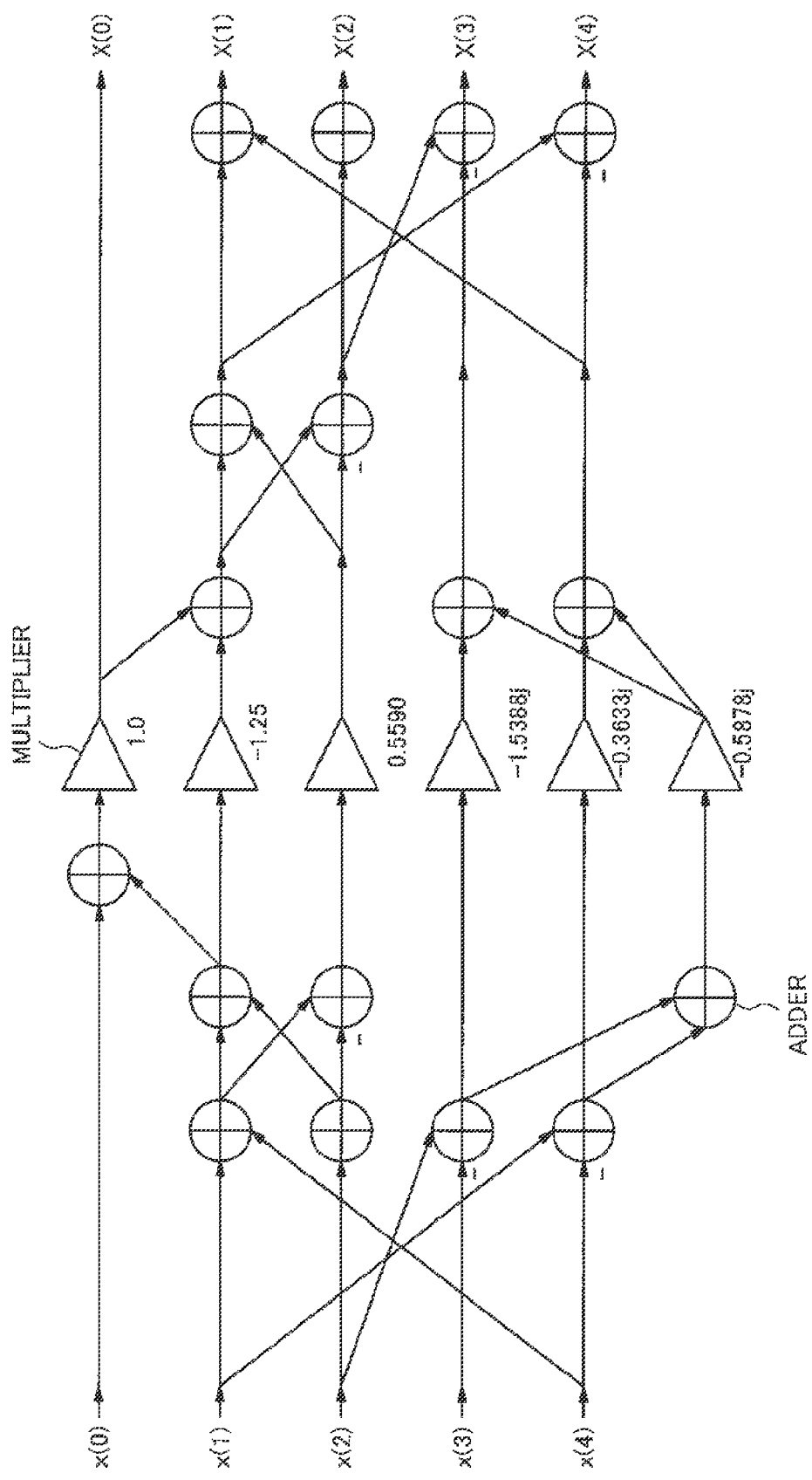
FIG. 10 is a schematic diagram explaining a radix-5 butterfly operation
Figure 11:
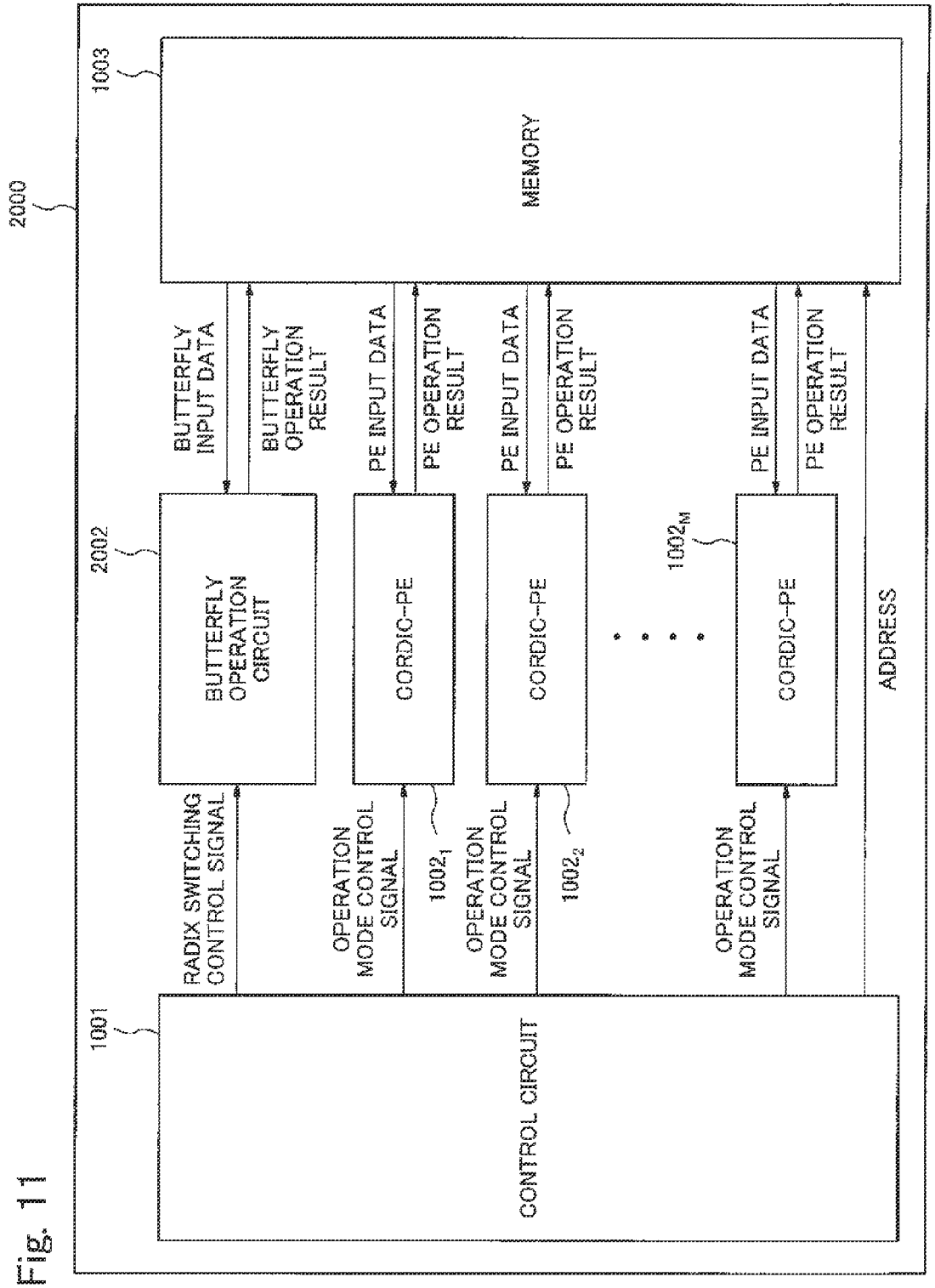
FIG. 11 is a schematic block diagram showing composition of a processor shown in the second related art.

It is noted that the present invention is not limited to the exemplary embodiment described above, and various exemplary embodiments may be applicable. For example, the processor according to the present invention may apply composition shown in FIG. 6. A processor 1 shown in FIG. 6 includes an operation unit (operation means) 2 and a control unit (control means) 3. The operation unit 2 includes a plurality of shift addition-and-subtraction parts (shift addition-and-subtraction means) which are connected each other so as to be able to carry out the CORDIC (COordinate Rotation DIgital Computer) operation. The shift addition-and-subtraction part carries out also the shift addition-and-subtraction process of the butterfly operation operating the shift addition-and-subtraction process including one or more than one stages. The control unit 3 instructs the operation unit 2 to carry out the CORDIC operation or the butterfly operation based on data from an outside. Similarly to the processor 10 according to the above-mentioned exemplary embodiment, the processor 1 also can carry out the DFT operation efficiently without making a part of the basic operational circuit idle even when carrying out a process other than the DFT operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-142206, filed on Jun. 23, 2010, the disclosure of which is incorporated herein in its entirety by reference.

[Industrial Applicability]

The present invention is effective in a processor which carries out the CORDIC operation.

[Reference Signs List]

1 and 10: Processor
2: Operation unit
3: Control unit
100: Control circuit
200: Operational circuit (CORDIC and butterfly operational circuit)
210: Shift control circuit
220: Shift circuit
221: Crossbar
222: S&L (shifter and LUT)
223: Addition-and-subtraction device
224: Rotation direction determination circuit
300: Memory
1001: Control circuit
1002: CORDIC-PE
1003: Memory
2002: Butterfly operational circuit

The invention claimed is:

1. A processor, comprising:
an operational circuit including a plurality of shift addition-and-subtraction units which are connected each other so as to be able to carry out a CORDIC (COordinate Rotation DIgital Computer) operation, and each of which carries out a shift addition-and-subtraction process in a butterfly operation including the shift addition-and-subtraction process composed of one or more one stages; and
a control circuit which instructs the operation circuit to carry out the CORDIC operation or the butterfly operation based on data received from an outside;
wherein:
when the control circuit instructs the operation circuit to carry out the butterfly operation, the control circuit provides the operation circuit with information which indicates a radix of the butterfly operation;
the operation circuit further includes a shift addition-and-subtraction control unit which provides the shift addition-and-subtraction unit with information which controls a combination of data, to which an addition-and-subtraction is carried out in the shift addition-and-subtraction process, based on the information indicating the radix;
when the shift addition-and-subtraction process includes a coefficient multiplication, the shift addition-and-subtraction control unit further provides shift addition-and-subtraction unit, which carries out the coefficient multiplication, with information indicating number of bit-shifts of data which is multiplied with a coefficient based on the information indicating the radix;
the data includes real part data which indicates a real part of a complex number, and imaginary part data which indicates an imaginary part of the complex number; and
when the coefficient used in the coefficient multiplication is an imaginary number, the shift addition-and-subtraction control unit further provides the shift addition-and-subtraction unit, which carries out the coefficient multiplication, with information to control switching between the real part data and the imaginary part data which are multiplied with the coefficient of the imaginary number.

2. The processor according to claim 1, wherein
the data includes real part data which indicates a real part of a complex number, and imaginary part data which indicates an imaginary part of the complex number, and
when a number which is two times larger than the radix of the butterfly operation is larger than a number of data which the shift addition-and-subtraction unit is able to input, the shift addition-and-subtraction control circuit, in cycles different from each other, controls the shift addition-and-subtraction process for the real part data and controls the shift addition-and-subtraction process for the imaginary part data.

3. An operating method, wherein
based on data received from an outside, by a processor including operation which has a plurality of shift addition-and-subtraction means connected to each other so as to be able to carry out a CORDIC operation, the shift addition-and-subtraction means carries out a shift addition-and-subtraction process in a butterfly operation including the shift addition-and-subtraction processes composed of one or more stages; and
a control means instructs the processor to carry out the CORDIC operation or the butterfly operation based on data received from an outside;
wherein:
when the control means instructs the processor to carry out the butterfly operation, the control means provides the processor with information which indicates a radix of the butterfly operation;
the processor further includes shift addition-and-subtraction control means which provides the shift addition-and-subtraction means with information which controls a combination of data, to which an addition-and-subtraction is carried out in the shift addition-and-subtraction process, based on the information indicating the radix;
when that the shift addition-and-subtraction process includes a coefficient multiplication, the shift addition-and-subtraction control means further provides shift addition-and-subtraction means, which carries out the coefficient multiplication, with information indicating number of bit-shifts of data which is multiplied with a coefficient based on the information indicating the radix;

the data includes real part data which indicates a real part of a complex number, and imaginary part data which indicates an imaginary part of the complex number; and when that the coefficient used in the coefficient multiplication is an imaginary number, the shift addition-and-subtraction control means further provides the shift addition-and-subtraction means, which carries out the coefficient multiplication, with information to control switching between the real part data and the imaginary part data which are multiplied with the coefficient of the imaginary number.

4. A processor, comprising:

operation means including a plurality of shift addition-and-subtraction means which are connected to each other so as to be able to carry out a CORDIC (COordinate Rotation DIgital Computer) operation, and each of which carries out a shift addition-and-subtraction process in a butterfly operation including the shift addition-and-subtraction process composed of one or more stages; and control means instructing the operation means to carry out the CORDIC operation or the butterfly operation based on data received from an outside;

wherein:

when the control means instructs the operation means to carry out the butterfly operation, the control means provides the operation means with information which indicates a radix of the butterfly operation;

the operation means further includes shift addition-and-subtraction control means which provides the shift addition-and-subtraction means with information which controls a combination of data, to which an addition-and-subtraction is carried out in the shift addition-and-subtraction process, based on the information indicating the radix;

when the shift addition-and-subtraction process includes a coefficient multiplication, the shift addition-and-subtraction control means further provides shift addition-and-subtraction means, which carries out the coefficient multiplication, with information indicating number of bit-shifts of data which is multiplied with a coefficient based on the information indicating the radix;

the data includes real part data which indicates a real part of a complex number, and imaginary part data which indicates an imaginary part of the complex number; and when the coefficient used in the coefficient multiplication is an imaginary number, the shift addition-and-subtraction control means further provides the shift addition-and-subtraction means, which carries out the coefficient multiplication, with information to control switching between the real part data and the imaginary part data which are multiplied with the coefficient of the imaginary number.

* * * * *

UNITED STATES PATENT AND TRADEMARK OFFICE
CERTIFICATE OF CORRECTION

PATENT NO. : 9,021,003 B2     Page 1 of 1
APPLICATION NO. : 13/805519
DATED : April 28, 2015
INVENTOR(S) : Katsutoshi Seki It is certified that error appears in the above-identified patent and that said Letters Patent is hereby corrected as shown below:

Specification

Column 10, Line 31: Delete "$220_{J+1}$." and insert -- $220_{j+1}$. --

Signed and Sealed this
Nineteenth Day of January, 2016

Michelle K. Lee
*Director of the United States Patent and Trademark Office*